United States Patent
Hata et al.

(10) Patent No.: US 9,994,212 B2
(45) Date of Patent: *Jun. 12, 2018

(54) DRIVE CONTROL SYSTEM FOR HYBRID VEHICLE

(71) Applicant: TOYOTA JIDOSHA KABUSHIKI KAISHA, Toyota-shi, Aichi (JP)

(72) Inventors: Kensei Hata, Sunto-gun (JP); Yuji Iwase, Mishima (JP); Yosuke Suzuki, Hadano (JP); Akira Murakami, Gotenba (JP); Akiko Nishimine, Toyota (JP); Sohei Murata, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/878,707

(22) Filed: Oct. 8, 2015

(65) Prior Publication Data

US 2016/0101773 A1   Apr. 14, 2016

(30) Foreign Application Priority Data

Oct. 14, 2014   (JP) .................. 2014-210073

(51) Int. Cl.
*B60W 20/10*   (2016.01)
*B60K 6/445*   (2007.10)
(Continued)

(52) U.S. Cl.
CPC ............. *B60W 20/10* (2013.01); *B60K 6/365* (2013.01); *B60K 6/445* (2013.01); *B60W 10/06* (2013.01);
(Continued)

(58) Field of Classification Search
CPC ...... B60W 10/06; B60W 10/08; B60W 10/04; B60W 10/196; B60W 20/00; B60W 20/10;
(Continued)

(56) References Cited

U.S. PATENT DOCUMENTS 5,788,006 A    8/1998  Yamaguchi
6,722,456 B2   4/2004  Hisada
(Continued)

FOREIGN PATENT DOCUMENTS

JP   H08-295140 A   11/1996
JP   2011-214715 A  10/2011
(Continued)

OTHER PUBLICATIONS

Jul. 14, 2016 Office Action issued in U.S. Appl. No. 14/879,605.

*Primary Examiner* — Abby Y Lin
(74) *Attorney, Agent, or Firm* — Oliff PLC (57) ABSTRACT

A drive control system for preventing damage from a power distribution device under a motor mode and for improving fuel efficiency. A time duration from termination of the first operating mode where a torque of the first motor is applied to the power distribution device while halting a carrier (at step S4), and a temperature of the power distribution device is estimated based on the calculated time duration (at step S13). The first operating mode is enabled if the estimated temperature is lower than a predetermined allowable temperature (at step S15), and inhibited if the estimated temperature is higher than the allowable temperature (at step S10).

10 Claims, 4 Drawing Sheets

(51) Int. Cl.
  *B60W 20/00* (2016.01)
  *B60K 6/365* (2007.10)
  *B60W 20/40* (2016.01)
  *B60W 30/182* (2012.01)
  *B60W 10/08* (2006.01)
  *B60W 10/06* (2006.01)
  *B60W 10/196* (2012.01)
  *B60W 30/184* (2012.01)
  *B60K 6/38* (2007.10)
  *B60W 50/00* (2006.01)

(52) U.S. Cl.
  CPC .......... *B60W 10/08* (2013.01); *B60W 10/196* (2013.01); *B60W 20/00* (2013.01); *B60W 20/40* (2013.01); *B60W 30/182* (2013.01); *B60W 30/1843* (2013.01); *B60K 2006/381* (2013.01); *B60W 2050/0028* (2013.01); *B60W 2710/06* (2013.01); *B60W 2710/08* (2013.01); *B60W 2710/18* (2013.01); *Y10S 903/93* (2013.01)

(58) Field of Classification Search
  CPC ............... B60W 20/40; B60W 30/182; B60W 30/1843; B60W 2050/0028; B60W 2710/06; B60W 2710/18; Y10S 901/93; Y10S 901/903; Y10S 901/945; B60K 6/365; B60K 6/445; Y02T 10/6286
  See application file for complete search history.

(56) References Cited

U.S. PATENT DOCUMENTS

| | | | |
|---|---|---|---|
| 7,565,938 | B2 | 7/2009 | Hisada et al. |
| 7,694,762 | B2 | 4/2010 | Supina et al. |
| 8,594,876 | B2 | 11/2013 | Takami et al. |
| 9,555,794 | B2* | 1/2017 | Hata ................ B60K 6/445 |
| 9,573,587 | B2* | 2/2017 | Hata ................ B60W 20/40 |
| 2011/0230292 | A1 | 9/2011 | Komatsu et al. |
| 2015/0367832 | A1 | 12/2015 | Oshiumi |
| 2016/0101771 | A1 | 4/2016 | Hata et al. |
| 2016/0101773 | A1 | 4/2016 | Hata et al. |

FOREIGN PATENT DOCUMENTS

| | | |
|---|---|---|
| JP | 2016-078551 A | 5/2016 |
| JP | 2016-078552 A | 5/2016 |
| WO | 2014/091582 A1 | 6/2014 |

\* cited by examiner

DRIVE CONTROL SYSTEM FOR HYBRID VEHICLE

The present invention claims the benefit of Japanese Patent Application No. 014-210073 filed on Oct. 14, 2014 with the Japanese Patent Office, the disclosure of which is incorporated herein by reference in its entirety.

BACKGROUND

Field of the Invention

Preferred embodiments relate to the art of a control system for hybrid vehicles in which a motor is used not only to control an engine speed but also to generate a drive force for propelling the vehicle.

Discussion of the Related Art

U.S. Pat. No. 5,788,006 to Yamaguchi describes a so-called "dual motor type" hybrid vehicle provided with a planetary gear unit functioning as a differential gear system. In the planetary gear unit, a carrier is connected to the engine, a sun gear is connected to a first generator/motor, and a ring gear is connected to a differential unit through a counter gear unit. The counter gear unit is also connected to a second motor so that the second motor is allowed to be activated by an electric power supplied from the first generator/motor. The differential gear system is allowed to serve as a speed reducing device by stopping a rotation of an input shaft connected to the carrier by a brake so that torque of the first generator/motor applied to the ring gear can be multiplied.

US2011/0230292 A1 also describes a vehicle drive apparatus similar to the hybrid vehicle taught by U.S. Pat. No. 5,788,006. In the drive apparatus of this kind, the carrier is halted when the vehicle is towed while stopping the engine, and hence pinion gears and pinion pins may not be lubricated sufficiently. In order to avoid such a disadvantage, according to the teachings of US2011/0230292 A1, the drive apparatus is provided with a lubricant receiver having a lubricating passage connecting a fluid retainer situated above a planetary gear unit with the pinion gears.

As described, in the hybrid vehicle taught by U.S. Pat. No. 5,788,006, the differential gear system is allowed to serve as the speed reducing device by stopping a rotation of the carrier by the brake while stopping the engine. Consequently, the multiplied torque of the first generator/motor can be transmitted to wheels through the ring gear to propel the vehicle. In this situation, however, lubricant would not be lifted by the carrier, and hence the pinion gears and the pinion pins may not be lubricated sufficiently.

As also described, the vehicle drive apparatus taught by US2011/0230292 A1 is provided with the lubricant receiver having the lubricating passage connecting the fluid retainer with the pinion gears. In the drive apparatus taught by US2011/0230292 A1, therefore, the pinion gears etc. may be lubricated sufficiently if sufficient amount of the lubricant is retained in the retainer. However, if the remaining lubricant in the retainer is nearly exhausted or if viscosity of the lubricant is high, the pinion gears etc. may not be lubricated sufficiently. In addition, significant modification is required to install such additional lubricant receiver in the drive apparatus, and consequently, the vehicle drive unit would be enlarged.

Aspects of preferred embodiments have been conceived noting the foregoing technical problems, and it is therefore an object of various preferred embodiments to provide a drive control system for hybrid vehicles, which limits damage to a planetary gear unit to extend duration of an electric propulsion mode in which the vehicle is powered by a motor connected to a power distribution device.

SUMMARY OF THE INVENTION

Preferred embodiments relate to a drive control system for a hybrid vehicle. Specifically, the drive control system is applied to a vehicle comprising: an engine; a power distribution device that performs a differential action among a carrier rotated by an engine torque, a sun gear, and a ring gear; a braking device that selectively stop rotation of the carrier; a first motor having a generating function that is connected to any one of the sun gear and the ring gear; an output member that is connected to any one of the other sun gear and ring gear; and a second motor that generates a drive torque to be added to a torque of the output member. In the hybrid vehicle, an operating mode can be selected between a first operating mode and a second operating mode by a controller. Under the first operating mode, the vehicle is propelled by a torque of the first motor delivered to the output member through the power distribution device while stopping the rotation of the carrier by the braking device, and the torque of the second motor added to the torque of the first motor. On the other hand, under the second operating mode, the vehicle is powered by the engine or the second motor while allowing the carrier to rotate. In order to achieve the above-explained objective, according to preferred embodiments, the drive control system is configured to calculate a time duration from termination of the first operating mode; estimate a temperature of the power distribution device based on the calculated time duration; enable the first operating mode when the estimated temperature is lower than a predetermined allowable temperature; and inhibit the first operating mode when the estimated temperature is higher than the allowable temperature.

The controller determines a termination of the first operating mode if a cessation of the first operating mode is longer than a predetermined period of time, and calculates a duration of the cessation of the first operating mode from the termination of the first operating mode.

Specifically, the controller estimates the temperature of the power distribution device based on the calculated time duration and a lowering rate of the temperature of the power distribution device, and increases the lowering rate with an increment of a vehicle speed under the second operating mode, or an increment of a difference between a temperature of lubricant delivered to the power distribution device and the temperature of the power distribution device.

The controller is further configured to estimate an initial temperature of the power distribution device at the termination of the first operating mode. If the initial temperature is lower than a predetermined reference temperature, the controller calculates the temperature of the power distribution device by subtracting a temperature calculated based on the calculated time duration and the lowering rate from the reference temperature. By contrast, if the initial temperature is higher than the reference temperature, the controller calculates the temperature of the power distribution device by subtracting a temperature calculated based on the calculated time duration and the lowering rate from the initial temperature.

In addition, the controller inhibits the first operating mode if the calculated time duration is shorter than a predetermined shortest down-time required after the termination of the first operating mode.

Thus, according to preferred embodiments, the time duration of cessation of the first operating mode is calculated from the termination of the first operating mode, and the temperature of the power distribution device is estimated based on the calculated time duration. If the estimated temperature is higher than the allowable temperature, the first operating mode is inhibited. Given that the carrier is halted under the first operating mode, the power distribution device may not be lubricated sufficiently and would be subjected to a high friction when operated by the torque of the first motor. According to preferred embodiments, however, the first operating mode where the power distribution device is frictionally heated is inhibited if the temperature of the power distribution device is higher than the reference temperature. Therefore, temperature of pinion gears and pinion pins will not be raised excessively so that the power distribution device can be prevented from being damaged thermally. In addition, the allowable temperature of the first operating mode can be set as high as possible so that the first operating mode where the vehicle is powered by the first and the second motors can be extended as long as possible. For this reason, fuel efficiency of the vehicle can be improved.

As described, the controller is configured to determine a termination of the first operating mode if a temporary cessation of the first operating mode is longer than a predetermined period of time. That is, the first operating mode will not be restarted until the temperatures of the pinion gears and the pinion pins supported by the carrier are sufficiently lowered.

The heat of the power distribution device can be removed efficiently if the vehicle speed is high so that an ample amount of lubricant can be delivered to the power distribution device, or if a temperature of the lubricant is sufficiently low. In such situation, the lowering rate of the temperature of the power distribution device is set to a larger value. That is, if a heat radiation of the power distribution device per unit of time large, a waiting time to restart the first operating mode can be shortened so that the first operating mode can be established as frequent as possible and as long as possible thereby improving fuel efficiency.

As also described, the controller is further configured to estimate an initial temperature of the power distribution device at the termination of the first operating mode. If the initial temperature at a commencement of measurement of the duration of cessation is lower than the reference temperature, the controller calculates the temperature of the power distribution device on the assumption that the temperature is lowering from the reference temperature. Therefore, the temperature of the power distribution device would not be erroneously estimated too low.

In addition, if the time duration of cessation of the first operating mode is shorter than a predetermined shortest down-time required after the termination of the first operating mode, the controller inhibits the first operating mode irrespective of the temperature of the power distribution device. Therefore, the power distribution device can be prevented from being damaged thermally under the first operating mode.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 5:
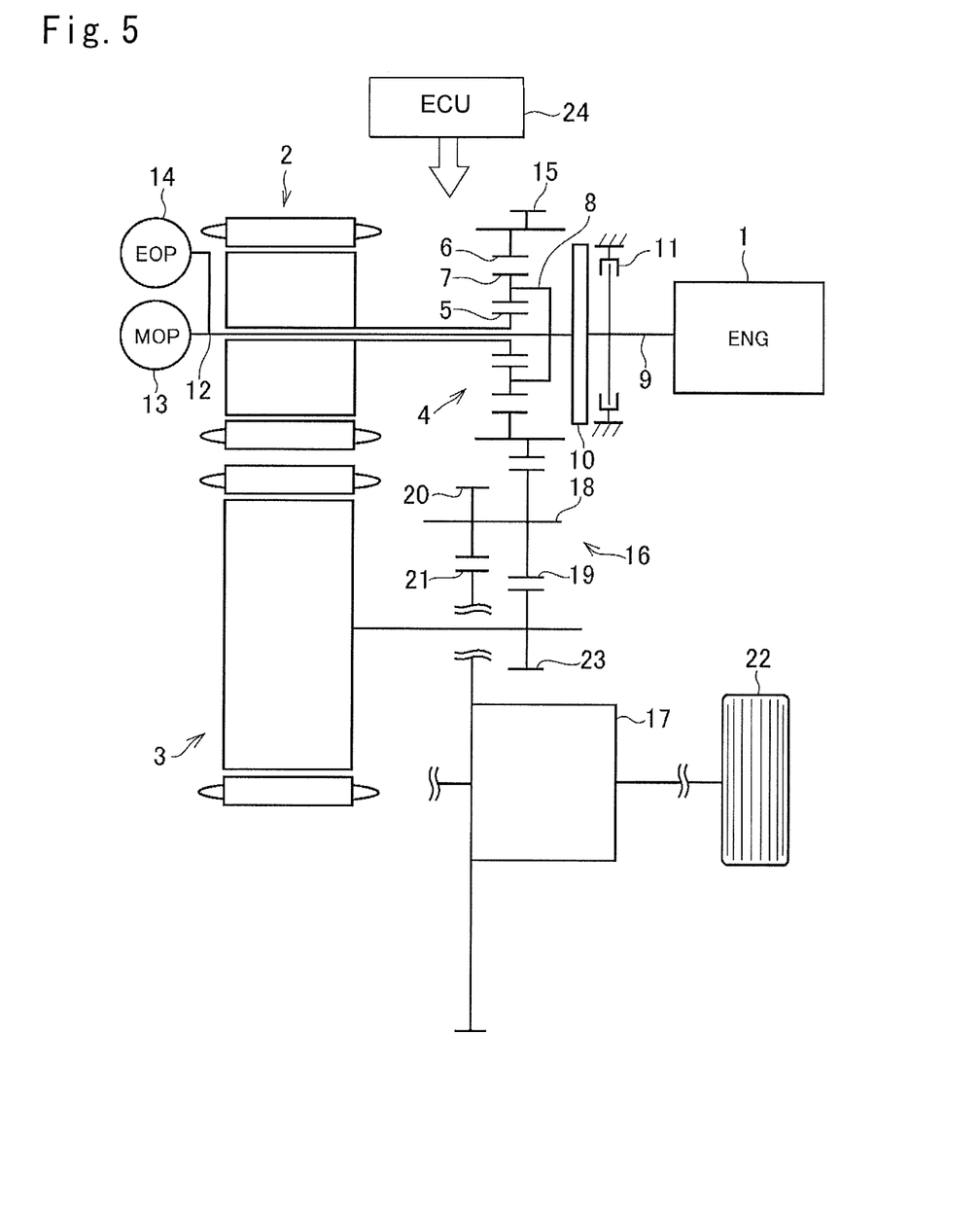
FIG. 5 is a schematic illustration of the hybrid vehicle to which the control system according to a preferred embodiment is applied.

A preferred example of the present disclosure will now be explained in more detail with reference to the accompanying drawings. A hybrid vehicle to which the drive control system according to preferred embodiments is illustrated in FIG. 5. A hybrid drive unit employed in the hybrid vehicle shown therein includes an engine 1 (abbreviated as ENG in FIG. 1), a first motor 2 and a second motor 3. Specifically, an internal combustion engine such as a gasoline engine, a diesel engine etc. may be employed as the engine 1, and a motor-generator functioning not only as a motor but also as a generator may be employed as each motor 2 and 3. The engine 1 is coupled to a single-pinion planetary gear unit serving as a power distribution device 4 to distribute power to the first motor and an output member.

In the power distribution device 4, a plurality of pinion gears (e.g., three pinion gears) 7 are interposed between a sun gear 5 and a ring gear 6 while meshing therewith, and those pinion gears 7 are supported by a carrier 8 while being allowed to rotate and revolve around the sun gear 5. Specifically, each pinion gear 7 is fitted onto a pinion pin through a needle bearing, and the pinion pin is held by the carrier 7. In order to deliver lubricant oil to the bearing and tooth flanks, the pinion pin is provided with an oil passage extending along a center axis, and an oil hole opening outwardly of the pinion pin.

Specifically, an output shaft (i.e., a crankshaft) 9 of the engine 1 is coupled to the carrier 8 via a damper device 10 so that the power of the engine 1 is transmitted to the carrier 8. That is, the carrier 8 serves as an input element of the power distribution device 4. A brake 11 such as a friction brake, a dog brake or the like is interposed between the engine 1 and the carrier 8 to selectively stop rotation of the carrier 8.

The first motor 2 arranged coaxially with the engine 1 across the power distribution device 4 is coupled to the sun gear 5. That is, the sun gear 5 serves as a reaction element. A rotor shaft of the first motor 2 has a hollow structure, and connected to a hollow shaft of the sun gear. A pump shaft 12 is inserted into those hollow shafts in a manner such that one end is joined to the engine 1 and the other end is joined to a mechanical oil pump (abbreviated as MOP in FIG. 1, and to be called "a first oil pump" hereinafter) 13 that is driven by the engine 1 to generate oil pressure and to discharge lubricating oil. During cessation of engine operation, an electric oil pump (abbreviated as EOP in FIG. 1, and to be called "a second oil pump" hereinafter) 14 arranged parallel to the first oil pump 13 generates oil pressure instead of the first oil pump 13.

The ring gear 6 serves as an output element of the power distribution device 4, and to this end the ring gear is integrated with an external output gear 15 serving as the output member of a preferred embodiment. The output gear 15 is connected to a differential gear unit 17 via a counter gear unit 16. In the counter gear unit 16, specifically, a driven gear 19 is fitted onto a counter shaft 18 while meshing with the output gear 15, and a diametrically smaller drive gear 20 is also fitted onto the counter shaft 18 while meshing with a ring gear 21 of the power distribution device 4 to transmit power to a pair of drive wheels 22. The driven gear 19 also meshes with another drive gear 23 connected to the second motor 3 so that torque of the second motor 3 is added to torque of the output gear 15.

The first motor 2 and the second motor 3 are electrically connected to each other through a not shown storage device or an inverter to transfer electricity therebetween.

An operating mode of the hybrid vehicle according to the preferred example can be selected from a dual motor mode, a single motor mode and a hybrid mode (abbreviated as "HV" mode hereinafter). Under the dual motor mode corresponding to the claimed "first operating mode", the vehicle is powered by both the first motor 2 and the second motor 3, and the carrier 8 is halted by the brake 11 so that rotational speed of the output gear 15 is reduced by the power distribution device 4 to be lower than that of the first motor 2. There are two modes corresponding to the claimed "second operating mode," a single motor mode, and an HV mode. Under the single motor mode, which corresponds to the claimed "second operating mode", the vehicle is powered only by the second motor 3, without contribution from the first motor 2 or the engine 1. Under the HV mode also corresponding to the claimed "second operating mode", the power of the engine 1 is distributed through the power distribution device 4 to the first motor 2 side and to the output gear 15 side, and the second motor 3 is driven by the electric power generated by the first motor 2 to generate drive torque. Thus, in HV mode, torque is delivered to drive wheels 22 through the differential gear unit 17 from the second motor 3, and from the engine 1, which is delivered through the output gear 15 of the counter gear unit 16.

Figure 2:
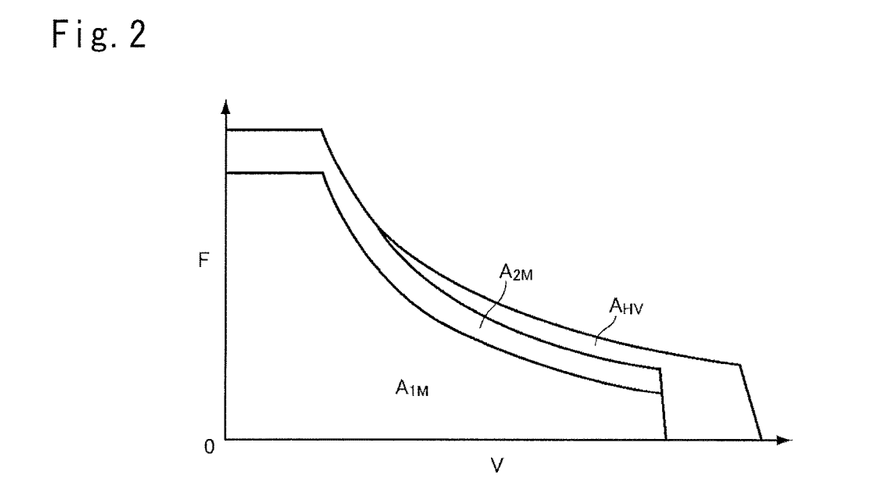
FIG. 2 is a map defining the HV mode, the single motor mode, and the dual motor mode according to the preferred example.

Those operating modes are selected to achieve required torque and desired fuel efficiency. To this end, the operating mode is determined with reference to a map shown in FIG. 2 where regions to select the operating mode are defined based on vehicle speed and required drive force represented by an opening degree of an accelerator. In FIG. 2, "$A_{1M}$" represents the region where the single motor mode is selected, "$A_{2M}$" represents the region where the dual motor mode is selected, and "$A_{HV}$" represents the region where the HV mode is selected. In order to select the operating mode and to control the hybrid vehicle shown in FIG. 5, the hybrid vehicle is provided with an electronic control unit (abbreviated as the "ECU" hereinafter) 24 serving as the claimed controller. The ECU is comprised of a microcomputer adapted to carry out a calculation based on input data while with reference to the preinstalled map, and calculation results are sent to the engine 1, the motors 2 and 3, the electric storage device or the inverter, the brake 11 and etc. in the form of command signals. The input data to the ECU 24 includes data about a vehicle speed, an accelerator opening degree, rotational speeds of the motors 2 and 3, drive currents of the motors 2 and 3, a temperature of the lubricant (i.e., an oil temperature), an ON/OFF status of an ignition switch, a status of a grille shutter including opening duration and closing duration, an external temperature and so on. For example, the above-mentioned map shown in FIG. 2, rates of temperature drop and rates of temperature rise of the pinion gears and the pinion pins, initial temperatures of the pinion gears and the pinion pins, threshold values of time and temperatures are preinstalled in the ECU 24.

Figure 1:
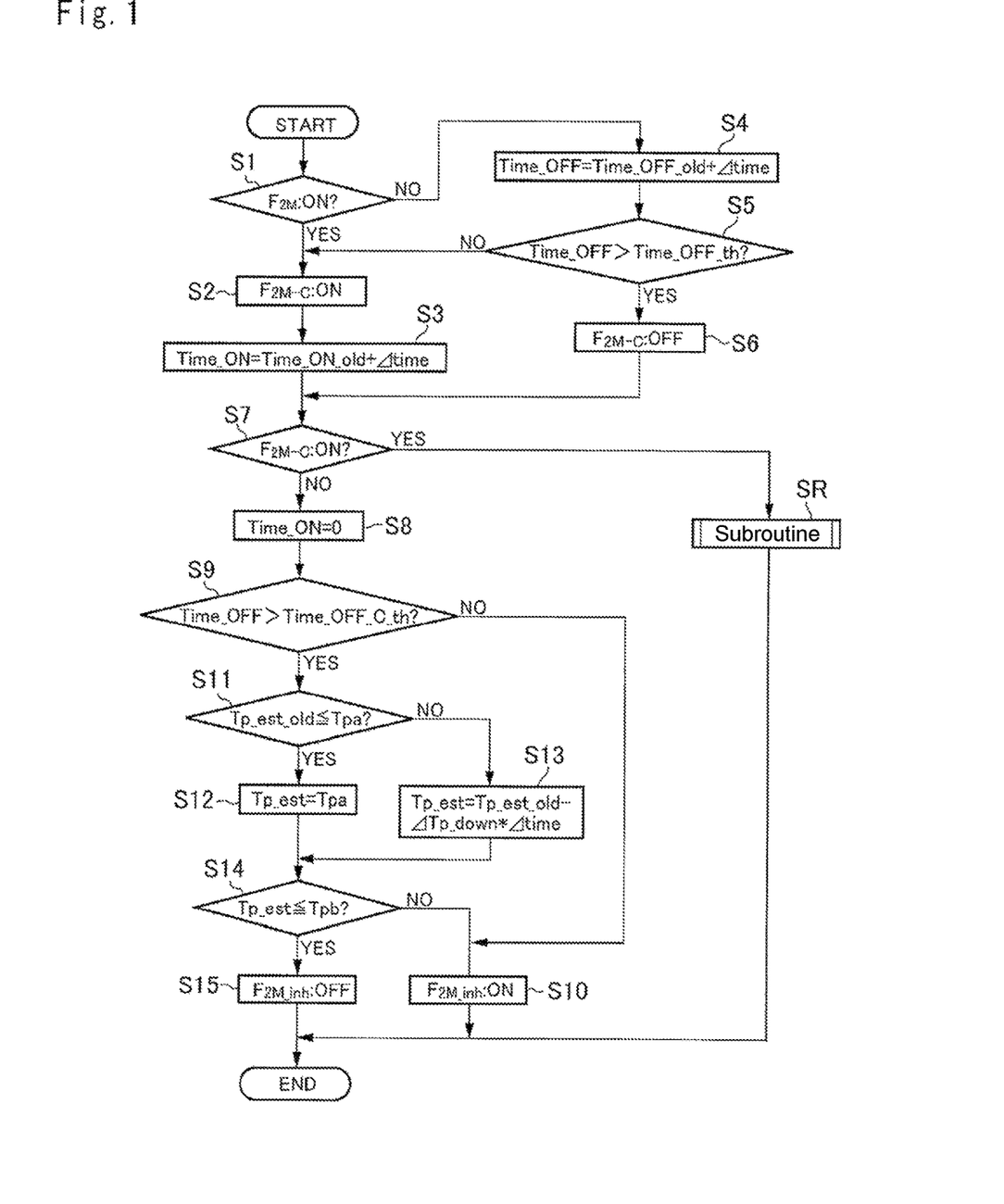
FIG. 1 is a flowchart illustrating steps of exemplary control according to the preferred embodiments.

The drive control system according to the preferred example is configured to propel the vehicle under the dual motor mode corresponding to the claimed first operating mode as frequent as possible and as long as possible thereby improving fuel efficiency. To this end, the drive control system shifts the operating mode promptly to the dual motor mode in a manner to avoid excessive temperatures rise in the pinion gears 7 and the pinion pins. Referring now to FIG. 1, there is shown a preferred example of a routine that is carried out by the ECU 24 repeatedly at predetermined intervals while running the vehicle. According to the example shown in FIG. 1, first of all, it is determined whether or not a dual motor flag $F_{2M}$ is turned to "ON" at step S1. Specifically, the dual motor mode is selected when both the vehicle speed and the required drive force fall within the region $A_{2M}$, and the dual motor flag $F_{2M}$ is consequently turned to "ON".

If the dual motor flag $F_{2M}$ is "ON" so that the answer of step S1 is YES, a continuation flag $F_{2M-C}$ indicating a continuation of the dual motor mode is turned to "ON" at step S2. Specifically, the continuation flag $F_{2M-C}$ indicates whether or not the dual motor mode is terminated by a temporary cessation, and in this case, the continuation flag $F_{2M-C}$ is turned to "ON" to indicate that the dual motor mode is continued. Then, a count value Time_ON of a time duration of the dual motor mode is calculated at step S3. At step 3, specifically, an execution time Δtime of one cycle of the routine is added to a prior value Time_ON_old of the time duration of the dual motor mode calculated during the prior cycle. To this end, the prior value Time_ON_old is reset to "0" when the continuation flag $F_{2M-C}$ is turned to "ON". That is, in this case, such measurement of the time duration of the dual motor mode is started.

By contrast, if the dual motor flag $F_{2M}$ is turned to "OFF" so that the answer of step S1 is NO, a count value Time_OFF of a time duration from termination of the dual motor mode is calculated at step S4. That is, the count value Time_OFF is a time duration measured from the time the dual motor flag $F_{2M}$ is turned to "OFF". At step S4, specifically, the execution time Δtime of one cycle of the routine is added to a prior value Time_OFF_old of the time duration measured from termination of the dual motor mode calculated during the prior cycle. To this end, the prior value Time_OFF_old is reset to "0" when the dual motor flag $F_{2M}$ is turned to "OFF". That is, in this case, such measurement of the time duration from termination of the dual motor mode is started.

The count value Time_OFF thus calculated is compared to a predetermined threshold value Time_OFF_th at step S5. Specifically, the threshold value Time_OFF_th is a criterion for determining whether or not the time duration from termination of the dual motor mode is sufficient to cool the pinion gears 7 and the pinion pins. To this end, the threshold value Time_OFF_th is adjusted to specifications of the vehicle and hybrid drive unit based on experimentation. If the count value Time_OFF is smaller than the threshold value Time_OFF_th, that is, if cessation of the dual motor mode is shorter than the threshold value Time_OFF_th so that the answer of step S5 is NO, the routine advances to step S2 to turn the continuation flag $F_{2M-C}$ to "ON". By contrast, if the answer of step S5 is YES, the continuation flag $F_{2M-C}$ is turned to "OFF" at step S6. That is, the ECU 24 determines that the dual motor mode is continued even if the dual motor mode is temporarily interrupted but the count value Time_OFF of the time duration from termination of the dual motor mode is shorter than the threshold value Time_OFF_th. Thus, according to the example shown in FIG. 1, termination of the dual motor mode is determined to commence the measurement of the time duration from the termination based on a fact that the temperatures of the pinion gears 7 and the pinion pins start dropping.

After carrying out the control of step S3 or S6, it is determined whether or not the continuation flag $F_{2M\text{-}C}$ is currently "ON" at step S7. At step S7, specifically, it is determined whether or not the carrier 8 is halted while generating the torque by the first motor 2 thereby raising the temperatures of the pinion gears 7 and the pinion pins. In other words, it is determined whether or not the vehicle is propelled under the single motor mode or the HV mode corresponding to the claimed second operating mode. If the vehicle is propelled in the first operating mode, under the dual motor mode, the answer of step S7 is YES, the routine advances to subroutine SR to be carried out under the condition where the temperatures of the pinion gears 7 and the pinion pins are being raised. By contrast, if the dual motor mode has been terminated so that the answer of step S7 is NO, the count value Time_ON is reset to "0" at step S8. In this case, if the count value Time_ON has already been reset to "0", such reset of the count value Time_ON is merely repeated. Then, the count value Time_OFF of the time duration from termination of the dual motor mode is compared to a threshold value Time_OFF_C_th at step S9. Specifically, the threshold value Time_OFF_C_th is a criterion determined to protect the pinion gears 7 and the pinion pins. To this end, the threshold value Time_OFF_C_th is determined to the shortest down-time required after the high load operation such as the dual motor mode where the pinion gears 7 and the pinion pins are subjected to a high load or friction.

Accordingly, the time duration from termination of the dual motor mode should be shorter than the threshold value Time_OFF_C_th immediately after the termination of the dual motor mode and hence the answer of step S9 will be NO. In this case, in order to prevent the pinion gears 7 and the pinion pins from being subjected to a load repeatedly, an inhibition flag $F_{2M\text{-}inh}$ for inhibiting the dual motor mode is turned to "ON" at step S10. That is, the dual motor mode is inhibited. Then, the routine is returned.

By contrast, if the time duration from termination of the dual motor mode has exceeded the threshold value Time_OFF_C_th so that the answer of step S9 is YES, temperatures of the pinion gears 7 and the pinion pins (as will be simply called the "pinion temperature" hereinafter) is estimated, and availability of the dual motor mode is determined based on the pinion temperature Tp_est. Specifically, a previous (or an initial) pinion temperature Tp_est_old that has been estimated previously is compared to a reference temperature Tpa at step S11. The previous pinion temperature Tp_est_old may be estimated based on a preinstalled nominal value of the pinion temperature Tp_est calculated in a factory. If the estimated value of the pinion temperature Tp_est is considerably lower than an actual pinion temperature, the pinion temperature Tp_est being raised during the dual motor mode would be erroneously estimated too low. In order to avoid such inconvenience, the reference temperature Tpa is set to a lower limit value as a design value of the pinion temperature Tp_est in the beginning of the control. Therefore, if the previous pinion temperature Tp_est_old is equal to or lower than the reference temperature Tpa so that the answer of step S11 is YES, the reference temperature Tpa is employed as the pinion temperature Tp_est at step S12. By contrast, if the previous pinion temperature Tp_est_old is higher than the reference temperature Tpa so that the answer of step S11 is NO, a current value of the pinion temperature Tp_est lowering from the previous value Tp_est_old is calculated at step S13. Given that the vehicle is propelled under the operating mode other than the dual motor mode, ample amount of the lubricant oil is delivered to the power distribution device 4 so that the pinion temperature Tp_est is lowered at a predetermined lowering rate ΔTp_down.

The lowering rate ΔTp_down is to be explained in more detail. Under the single motor mode or the HV mode corresponding to the claimed second operating mode, the ring gear 6 of the power distribution device 4 is rotated by the drive force of the second motor 3 so that ample amount of the lubricant oil is lifted by the ring gear 6 thus rotated. Meanwhile, the engine 1 and the carrier 8 connected thereto are not rotated under the single motor mode, and the engine 1 and the first motor 2 do not generate a large drive torque under the single motor mode or the HV mode. That is, under those operating modes, the ring gear 6 of the power distribution device 4 is rotated without being subjected to an excessive load. In this situation, an amount of the lubricant oil lifted by the ring gear 6 is increased with an increment in the vehicle speed so that the power distribution device 4 can be lubricated sufficiently.

Under the HV mode, specifically, the carrier 8 is rotated by a torque of the engine 1 and the sun gear 5 is rotated by a torque of the first motor 2. Consequently, the lubricant oil is delivered amply to the power distribution device 4 by the rotations of those rotary elements. In this situation, the power distribution device 4 distributes the engine power to the ring gear 6 side and to the first motor 2 side without reducing the rotational speed. That is, the load applied to the power distribution device 4 is reduced in comparison with that of the case in which the power distribution device 4 serves as the speed reducing device. For this reason, a heat removal (i.e., a heat radiation) by the lubricant oil with respect to the heat of the pinion gears 7 and the pinion pins is increased so that those elements can be cooled.

Figure 3:
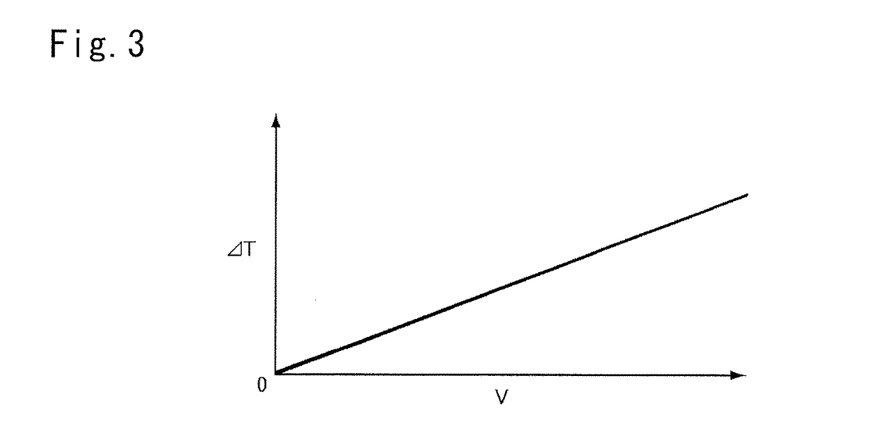
FIG. 3 is a graph relating to a lowering rate of pinion temperature to vehicle speed.
Figure 4:
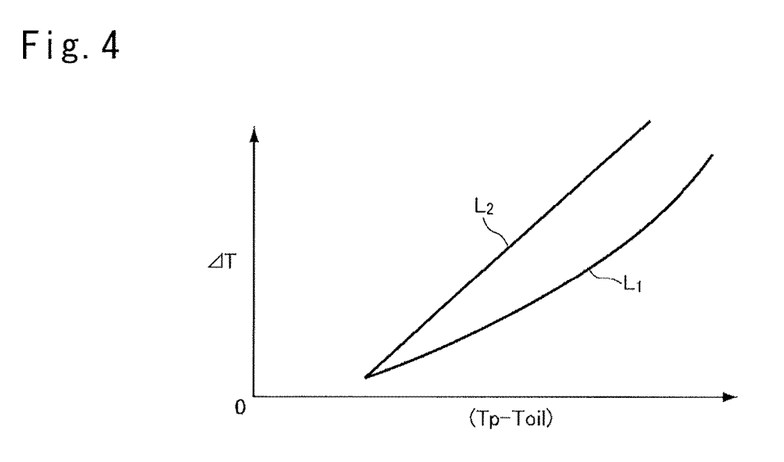
FIG. 4 is a graph relating to the lowering rate of pinion temperature to a temperature difference between the pinion and the oil.

FIG. 3 shows a relation between a change rate ΔT of the pinion temperature Tp_est (i.e., the lowering rate ΔTp_down per unit of time) and the vehicle speed V measured under the second operating mode. As can be seen from FIG. 3, the change rate ΔT of the pinion temperature Tp_est is increased in proportion to an increment of the vehicle speed V. As described, the pinion gears 7 and the pinion pins are cooled by drawing heats therefrom by the lubricant oil. FIG. 4 shows a relation between the change rate ΔT of the pinion temperature Tp_est and a temperature difference between the pinion temperature Tp_est and an oil temperature Toil (Tp−Toil) measured under a condition that the accelerator is closed. In FIG. 4, line L2 represents a measurement result of a case in which a delivery amount of the lubricant oil is increased by driving the second oil pump 14 in comparison with that of a case represented by line L1. As indicated in FIG. 4, the change rate ΔT of the pinion temperature Tp_est is increased with a decrement of the oil temperature Toil and with an increment of an amount of the lubricant oil.

As can be seen from the measurement results shown in FIGS. 3 and 4, the change rate ΔT of the pinion temperature Tp_est is increased with an increment of delivery amount of the lubricant oil or a reduction in the oil temperature so that the heats of the pinion gears 7 can be removed efficiently. Thus, the heat removal efficiency of the pinion gear 7 is governed mainly by: the temperature difference between the pinion temperature Tp_est and the oil temperature Toil; the vehicle speed V governing an amount of the lubricant oil lifted by the pinion gear 7; and the discharging amount of the second oil pump 14. According to the preferred example, therefore, the lowering rate ΔTp_down is set to a greater value as an increment of the above-mentioned temperature difference or the vehicle speed. In addition, the lowering rate ΔTp_down is further increased if the second oil pump 14 is driven. To this end, a map for increasing the lowering rate ΔTp_down is preinstalled using the above-mentioned factors as parameters. However, an actual lowering rate of the pinion temperature is varied depending on a capacity of an oil cooler (not shown), a configuration of a gear lifting the lubricant, an existence or number of projection(s) and so on. Therefore, the lowering rate ΔTp_down is determined based on an experiment using the actual devices.

After calculating an estimated value of the pinion temperature Tp_est at step S12 or S13, the pinion temperature Tp_est is compared to an allowable temperature Tpb at step S14. Specifically, the allowable temperature Tpb is a criterion value to inhibit the dual motor mode that is set to be higher value than the aforementioned reference temperature Tpa. Even if the pinion temperature Tp_est is lowered but not to be sufficiently lower than the reference temperature to inhibit the dual motor mode, the pinion temperature Tp_est would be raised immediately to exceed such inhibition temperature of the dual motor mode. In order to avoid such inconvenience, the allowable temperature Tpb is determined in a manner such that the restarted dual motor mode can be continued for a certain period of time.

If the pinion temperature Tp_est is higher than the allowable temperature Tpb so that the answer of step S14 is NO, the routine advances to step S10 to turn the inhibition flag $F_{2M\text{-}inh}$ for inhibiting the dual motor mode to "ON", and then ended. Consequently, the dual motor mode is inhibited. By contrast, if the pinion temperature Tp_est is equal to or lower than the allowable temperature Tpb so that the answer of step S14 is YES, the inhibition flag $F_{2M\text{-}inh}$ is turned to "OFF" at step S15 and the routine is ended. Consequently, the dual motor mode is permitted to be established. Thus, the drive control system according to a preferred embodiment is configured to determine the availability of the dual motor mode based on the pinion temperature Tp_est lowering after the termination of the dual motor mode. Therefore, the dual motor mode can be restarted in line with an actual condition of the pinion gears so that the dual motor mode can be extended without damaging the power distribution device 4 while preventing the pinion gears 7 from being heated excessively. Consequently, fuel efficiency of the vehicle can be improved.

Although the above exemplary embodiment of the present invention have been described, it will be understood by those skilled in the art that the present invention should not be limited to the described exemplary embodiments, but that various changes and modifications can be made within the spirit and scope of the present invention. For example, a double-pinion planetary gear unit may also be employed as the power distribution device 4 instead of the single-pinion planetary gear unit. Namely, the drive control system according to the present invention may be applied to any kind of hybrid vehicles in which the power distribution device is adapted to serve as a speed reducing device for the first motor by halting the carrier.

What is claimed is:

1. A drive control system for a hybrid vehicle, the drive control system comprising:
an engine,
a power distribution device configured to perform a differential action, the power distribution device including a carrier rotated by an engine torque, a sun gear, a ring gear, and pinion gears supported by the carrier and interposed between the sun gear and the ring gear,
a braking device that is configured to selectively stop rotation of the carrier,
a first motor configured such that a generating function is connected to any one of the sun gear and the ring gear,
an output member that is connected to any one of the sun gear and ring gear not connected to the first motor, and
a second motor that configured to generate a drive torque added to a torque of the output member,
a controller that is configured to:
establish a first operating mode where the vehicle is propelled by a torque of the first motor delivered to the output member through the power distribution device while stopping the rotation of the carrier by the braking device, and the torque of the second motor added to the torque of the first motor;
establish a second operating mode in which the vehicle is selectively powered by: the engine and the second motor, while allowing the carrier to rotate;
calculate a time duration from a termination of the first operating mode;
estimate a temperature of the power distribution device based on the calculated time duration;
enable the first operating mode when the estimated temperature is lower than a predetermined allowable temperature; and
inhibit the first operating mode when the estimated temperature is higher than the allowable temperature.

2. The drive control system for a hybrid vehicle as claimed in claim 1, wherein the controller is further configured to:
make a decision of the termination of the first operating mode when a time period of temporarily stopping the first operating mode is longer than a predetermined period of time; and
calculate the time duration from the termination of the first operating mode as an elapsed time after making the decision of the termination of the first operating mode.

3. The drive control system for a hybrid vehicle as claimed in claim 1, wherein the controller is further configured to:
estimate the temperature of the power distribution device based on the calculated time duration and a lowering rate of the temperature of the power distribution device; and
increase the lowering rate with an increment of a vehicle speed under the second operating mode, or an increment of a difference between a temperature of lubricant delivered to the power distribution device and the temperature of the power distribution device.

4. The drive control system for a hybrid vehicle as claimed in claim 1, wherein the controller is further configured to:
estimate an initial temperature of the power distribution device at the termination of the first operating mode;
calculate the temperature of the power distribution device by subtracting a temperature calculated based on the calculated time duration and the lowering rate from a reference temperature if the initial temperature is lower than the reference temperature; and
calculate the temperature of the power distribution device by subtracting a temperature calculated based on the calculated time duration and the lowering rate from the initial temperature if the initial temperature is higher than the reference temperature.

5. The drive control system for a hybrid vehicle as claimed in claim 1, wherein the controller is further configured to inhibit the first operating mode as a result of determining that the calculated time duration is shorter than a predetermined shortest down-time required after the termination of the first operating mode.

6. A drive control system for a hybrid vehicle, the drive control system comprising:
   an engine,
   a power distribution configured to perform a differential action, the power distribution device including a carrier rotated by an engine torque, a sun gear, a ring gear, and pinion gears supported by the carrier and interposed between the sun gear and the ring gear,
   a braking device that is configured to selectively stop rotation of the carrier,
   a first motor connected to one of the sun gear and the ring gear,
   an output member connected an other of the sun gear and ring gear not connected to the first motor, and
   a second motor configured to generate a drive torque added to a torque of the output member,
   a controller that is configured to:
      establish a first operating mode in which the vehicle is propelled by a torque of the first motor delivered to the output member through the power distribution device while stopping the rotation of the carrier by the braking device, and the torque of the second motor added to the torque of the first motor;
      establish a second operating mode in which the vehicle is selectively powered by one of: (i) the second motor alone, and (ii) the engine and the second motor, the second motor being powered indirectly by the engine through the first motor, while allowing the carrier to rotate;
      calculate a time duration from termination of the first operating mode;
      estimate a temperature of the power distribution device based on the calculated time duration;
      enable the first operating mode when the estimated temperature is lower than a predetermined allowable temperature; and
      inhibit the first operating mode when the estimated temperature is higher than the allowable temperature.

7. The drive control system for a hybrid vehicle as claimed in claim 6, wherein the controller is further configured to:
   make a decision of the termination of the first operating mode when a time period of temporarily stopping the first operating mode is longer than a predetermined period of time; and
   calculate the time duration from the termination of the first operating mode as an elapsed time after making the decision of the termination of the first operating mode.

8. The drive control system for a hybrid vehicle as claimed in claim 7, wherein the controller is further configured to:
   estimate the temperature of the power distribution device based on the calculated time duration and a lowering rate of the temperature of the power distribution device; and
   increase the lowering rate with an increment of a vehicle speed under the second operating mode, or an increment of a difference between a temperature of lubricant delivered to the power distribution device and the temperature of the power distribution device.

9. The drive control system for a hybrid vehicle as claimed in claim 8, wherein the controller is further configured to:
   estimate an initial temperature of the power distribution device at the termination of the first operating mode;
   calculate the temperature of the power distribution device by subtracting a temperature calculated based on the calculated time duration and the lowering rate from a reference temperature if the initial temperature is lower than the reference temperature; and
   calculate the temperature of the power distribution device by subtracting a temperature calculated based on the calculated time duration and the lowering rate from the initial temperature if the initial temperature is higher than the reference temperature.

10. The drive control system for a hybrid vehicle as claimed in claim 9, wherein the controller is further configured to inhibit the first operating mode as a result of determining that the calculated time duration is shorter than a predetermined shortest down-time required after the termination of the first operating mode.

* * * * *